United States Patent Office 3,822,207
Patented July 2, 1974

3,822,207
FIRE-FIGHTING
Robert David Howard and Donald Lomas, Runcorn, England, assignors to Imperial Chemical Industries Limited, London, England
No Drawing. Filed June 27, 1972, Ser. No. 266,727
Claims priority, application Great Britain, July 15, 1971, 33,308/71
Int. Cl. A62d 1/00
U.S. Cl. 252—8                                                   11 Claims

ABSTRACT OF THE DISCLOSURE

Chloropentafluoroethane is a general purpose fire extinguishing agent of low toxicity. In a mixture with other halogenated alkanes, especially bromochlorodifluoromethane and bromotrifluoromethane, very effective extinguishing compositions may be made giving low concentrations of breakdown products in use against liquid fuel fires.

This invention relates to fire fighting and new compositions for use therein.

According to the present invention there is provided a method of fire-control wherein chloropentafluoroethane is used as a volatile liquid fire-control agent.

For the purpose of the present invention chloropentafluoroethane may be used by itself or in admixture with other chemical compounds, for example non-inflammable adjuvants to provide a forceful discharge, vapour suppressants for safer storage in low-pressure cans, diluents to provide cheaper compositions, adjuvants that are themselves fire-extinguishing agent or materials which provide combinations of any of these or other functions.

Inorganic gases (for example carbon dioxide, nitrogen or argon), inorganic salts having fire-extinguishing properties (for example sodium bicarbonate, potassium bicarbonate or ammonium phosphate), urea, and the product of heating urea with alkalis (as described in our UK Pat. No. 1,118,215 and our UK Application No. 49,366/66, which corresponds to U.S. application Ser. No. 676,907, now Pat. No. 3,536,620) may also be used as adjuvants.

Compounds which may be used in admixture with chloropentafluoroethane to produce a composition with advantageous properties include halogenated alkanes (for example bromochlorodifluoromethane, dibromodifluoromethane, 1,1-dibromo-2,2,2-trifluoroethane, 1,2-dibromotetrafluoroethane, 1-bromo-2,2,2-trifluoroethane, bromotrifluoromethane, methyl bromide, dichlorodifluoromethane, chlorodifluoromethane, 1,1,1-trichloroethane or methylene chloride) preferably those fully halogenated alkanes containing at least one atom of bromine.

Chloropentafluoroethane possesses efficient flame-extinguishing properties combined with a low level of toxicity. Consequently mixtures containing a major proportion of chloropentafluoroethane and a minor proportion of the halogenated alkanes hereinbefore specified may also be used in expectation of properties similar to those of the pure major component.

However we have observed that the admixture of another halogenated alkane with chloropentafluoroethane has the advantage of reducing the concentration of breakdown products of chloropentafluoroethane in a flame. Concentrations of from 2%, i.e., 2.5% to 50% by weight of halogenated alkane may be used preferably from 3% to 15% by weight so that full advantage may be taken of the low toxicity of chloropentafluoroethane. The halogenated alkanes preferred are those which are good fire-extinguishants suitably those which are fully halogenated; those especially preferred being bromochlorodifluoromethane and bromotrifluoromethane. The use of mixtures of 5% to 10% of either bromochlorodifluoromethane or bromotrifluoromethane with 90% to 95% of chloropentafluoroethane against liquid fuel fires gives improved fire-fighting performance by reason of the cleaner atmosphere remaining after the fire has been extinguished e.g. the concentration of carbonyl halides was below the limits of detection, i.e. below 0.5 p.p.m.

Chloropentafluoroethane and bromotrifluoromethane were compared for their effect on the central nervous system of rats. At the highest usable concentration (i.e. 80% halocarbon and 20% oxygen) the chloropentafluoroethane had no effect after 10 mins. whereas visible evidence of effects on the rats was noted with bromotrifluoromethane. Such preliminary tests suggest that chloropentafluoroethane will be much safer in use for animals and humans than other known halocarbon fire-extinguishing agents. It is effective in extinguishant compositions for most commonly encountered fires for example fires caused by flammable liquids including hydrocarbon fuels and alcohols and flammable gases, fires originating from an electrical source and surface fires of solid combustible materials. Low toxicity of the fire-extinguishing agent is an important requirement when human beings or animals may be exposed to the vapours before they escape from the region of the fire, conditions often encountered for example in automatically-actuated systems which on a danger signal flood an area with fire-extinguishing material before a fire has started and when perhaps people are still working therein.

Chloropentafluoroethane is a stable compound which may be stored in containers, for example metal cans, without appreciable corrosion problems. The boiling point is —38.7° C. and therefore if it is desired to use the compound without propellants, mixtures containing it may be discharged by autogenous pressure.

Thus chloropentafluoroethane released into an atmosphere or compositions containing this agent at normal or elevated temperatures will volatilise readily and very quickly flood the area with flame-inhibiting vapour.

The methods of fire control included within this invention may be methods wherein the fire control agent is used to make an attack on a fire which has started or methods wherein the said agent is used to prevent or minimise risk of actual combustion. The attack on a fire may be a direct attack by discharging the agent at the seat of the fire or it may be an indirect attack by releasing the volatile agent into the zone surrounding the fire. Thus the vapour of the fire-control agent may be used to blanket the fire by reason of a high concentration of agent in a localised zone.

A fire occurring within a restricted region preferably a region bounded by walls, panels, floor or ceiling for example either a room, laboratory or workshop or an instrument or machine within a case may be controlled effectively by flooding the restricted region with chloropentafluoroethane or a composition containing chloropentafluoroethane.

The concentration of chloropentafluoroethane required in the atmosphere of the restricted region to extinguish a fire depends to some extent upon the fuel present and may be from 1% up to more than 50% but will generally be in the range 6% to 25% by volume. For example for a n-heptane fire, a vapour concentration of ca. 7% by volume will completely extinguish the flames while for a methanol fire ca. 12% will be required.

The term "seat of the fire" is used to denote the region from which flames emanate. The force of the flames, the emanation of burning gases or the explosive nature of many substances on combustion may prevent the fire-fighting material from penetrating to the actual seat of the fire. However, the direction of the discharge in the general region of the fire will provide an atmosphere around the fire which tends not to support combustion. Thereby the fierceness of the fire is partially quelled and continued discharge in the same direction has a greater chance of arriving at the actual seat of the fire and of extinguishing the fire completely.

Chloropentafluoroethane, or the composition containing chloropentafluoroethane, may conveniently be discharged from a pressurised extinguisher through a spray nozzle designed to provide the pattern and throw of discharge desired for the particular type of fire to be fought or the restricted region to be flooded with vapour.

Thus in or adjacent to the region susceptible to risk of fire an extinguisher or extinguishing system charged with a fire extinguishing composition may be prepared and be waiting in anticipation of a fire or risk thereof or the extinguisher may be introduced quickly after a fire has started. In the case of an extinguisher prepared in anticipation of a fire signal to discharge the extinguishant from the container may be produced automatically by a temperature or other sensing device set to detect any event which may lead to a fire or the initial stages of combustion. Alternatively the signal may be a manual signal given when danger of fire or the start of fire is observed and this will include the manual operation of a fire-extinguisher release valve in order to discharge the extinguishant from a conventional movable or fixed extinguisher.

The invention is illustrated but not limited by the following examples.

EXAMPLE 1

Chloropentafluoroethane was used to extinguish diffusion flames of the liquids n-heptane and methanol produced by a glass cup burner. The fire extinguishing material in vapour form mixed with air was introduced to the flame. The concentration of chloropentafluoroethane was gradually increased until the flame was just extinguished. The results for both heptane and methanol are given in Table 1.

TABLE 1

| Fuel | Air rate, ml./min. | Chloropentafluoroethane rate required, ml./min. | Percent v./v. chloropentafluoroethane |
|---|---|---|---|
| n-Heptane (AR) | 37,500 | 2,850 | 7.07 |
| Methanol (AR) | 37,500 | 5,000 | 11.60 |

EXAMPLE 2

A liquid extinguishant was charged to a container of about 2 cu. ft. capacity. After charging, the container was pressurised to about 150 p.s.i.g. with nitrogen. The charged container was placed in a 2500 cu. ft. room measuring 15 ft. x 15 ft. x 11 ft. high so that remote operation of a valve would result in discharge of the total contents towards the ceiling. The concentration of extinguishant at various points in the room was determined by means of sample lines leading to a previously calibrated katharometer. Fuel was placed in a circular tray 22 inches in diameter and 4 inches in depth and the tray placed in the centre of the floor of the room. (In the case of n-heptane 1 inch of fuel was poured on to 3 inches of water but when methanol was used as the fuel the water was omitted and the tray filled to the brim with methanol.) The fuel was ignited and allowed to burn for 5 seconds after which the extinguishant was discharged. The discharge time and the time to extinguish the fire were both recorded from the start of the discharge. The concentrations of $COCl_2$, HF, and HCl+HBr together were determined by placing Draeger tubes at a height of 5 ft. 6 inches in the centre of the room and drawing samples of the atmosphere through them immediately after the fire was extinguished. The concentration of the extinguishant mixture in the air feeding the fire was also determined at the instant of extinction, using the katharometer. Results are shown in Table 2. The chlorine content of the atmosphere after the fire was extinguished was also found to be below 2 p.p.m. in all cases.

TABLE 2

| Extinguishant composition mold percent | Fuel used in test | Discharge time in sec. | Extinction time in secs. | Vapour concentration of extinguishant, percent by volume | Breakdown products, p.p.m. by volume | | | |
|---|---|---|---|---|---|---|---|---|
| | | | | | HCl+HBr | HF | $COCl_2$* | CO |
| $C_2F_5Cl$ 100⊕ | n-Heptane | 15 | 15 | 9.5 | >120 | 70 | 5–10 | 500 |
| $C_2F_5Cl$ 100⊕ | do | 5 | 5 | 8.9 | 60 | 50 | 2.5 | 300 |
| 85% $C_2F_5Cl$+15% $CF_2ClBr$ | do | 13 | 6 | 7.4 | 20 | 20 | <0.5 | 50 |
| 85% $C_2F_5Cl$+15% $CF_2ClBr$ | do | 17 | 7 | 7.7 | 20 | 30 | <0.5 | 10 |
| 95% $C_2F_5Cl$+5% $CF_2ClBr$ | do | 7 | 3 | 6.7 | 10 | 15 | <0.5 | 50 |
| 90% $C_2F_5Cl$+10% $CF_3Br$ | do | 12 | 10 | 10.0 | 100 | 40 | <0.5 | 120 |
| $C_2F_5Cl$ 100% | Methanol | 20 | 25–45 | 11.7 | 100 | 50 | 2.5 | 50 |
| 95% $C_2F_5Cl$+5% $CF_2ClBr$ | do | 10 | 3–10 | 10.5 | 10 | 20 | <0.5 | <10 |

*The Draeger tube used for detection of $COCl_2$ is believed to respond also to other carbonyl halides.

What we claim is:

1. A fire-extinguishing composition consisting essentially of a major proportion of chloropentafluoroethane and a minor proportion of a non-flammable adjuvant selected from the group consisting of bromochlorodifluoromethane, dibromodifluoromethane, 1,1-dibromo-2,2,2-trifluoroethane, 1,2 - dibromotetrafluoroethane, 1 - bromo-2,2,2-trifluoroethane, bromotrifluoromethane, methyl bromide and dichlorodifluoromethane.

2. A fire-extinguishing composition as claimed in claim 1 wherein the adjuvant also functions as a propellent or vapour suppressant.

3. A composition as claimed in claim 1 wherein the halogenated alkane is bromotrifluoromethane.

4. A composition as claimed in claim 1 wherein the halogenated alkane is bromochlorodifluoromethane.

5. A composition as claimed in claim 1 containing 2% to 50% by weight of the adjuvant.

6. A composition as claimed in claim 5 containing 3% to 15% by weight of the said adjuvant.

7. A method of fire control comprising applying to a fire or a region susceptible to fire a fire control agent which has as the essential component at least a major proportion of chloropentafluoroethane.

8. A method of fire control as claimed in claim 7 wherein the fire control agent is directed at the seat of a fire.

9. A method of fire control as claimed in claim 7 wherein the fire control agent is released to flood a region susceptible to fire with the vapour of the said chloropentafluoroethane.

10. A method of fire control as claimed in claim 7 wherein the fire control agent is a composition which also contains a non-flammable adjuvant selected from the group consisting of bromochlorodifluoromethane, dibromodifluoromethane, 1,1 - dibromo - 2,2,2-trifluoroethane, 1,2 - dibromotetrafluoroethane, 1 - bromo - 2,2,2-trifluoroethane, bromotrifluoromethane, methyl bromide and dichlorodifluoromethane.

11. A fire extinguisher comprising a pressurized container and a discharge nozzle to provide a patterned discharge of fire extinguishing agent, said container having therein as the essential fire extinguishing agent at least a major proportion of chloropentafluoroethane.

(References on following page)

References Cited

UNITED STATES PATENTS

| | | | |
|---|---|---|---|
| 2,641,579 | 6/1953 | Benning | 252—8 |
| 2,641,580 | 6/1953 | Lewis | 252—8 |
| 2,668,419 | 2/1954 | Mapes | 252—8 |
| 3,276,999 | 10/1966 | Betlt et al. | 252—8 |

FOREIGN PATENTS

| | | | |
|---|---|---|---|
| 1,241,690 | 8/1971 | Great Britain | 252—8 |

MAYER WEINBLATT, Primary Examiner

U.S. Cl. X.R.

252—2